(12) United States Patent
Wendt et al.

(10) Patent No.: US 8,866,415 B2
(45) Date of Patent: Oct. 21, 2014

(54) DRIVER ARRANGEMENT WITH DIVISION CIRCUIT

(75) Inventors: Matthias Wendt, Wuerselen (DE); Harald Josef Gunther Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 838 days.

(21) Appl. No.: 12/995,490

(22) PCT Filed: Jun. 9, 2009

(86) PCT No.: PCT/IB2009/052432
§ 371 (c)(1),
(2), (4) Date: Dec. 1, 2010

(87) PCT Pub. No.: WO2009/153698
PCT Pub. Date: Dec. 23, 2009

(65) Prior Publication Data
US 2011/0074315 A1      Mar. 31, 2011

(30) Foreign Application Priority Data

Jun. 18, 2008   (EP) ..................................... 08104462

(51) Int. Cl.
*H05B 37/00*        (2006.01)
*H05B 33/08*        (2006.01)
(52) U.S. Cl.
CPC ................................. *H05B 33/0809* (2013.01)
USPC ............................ 315/312; 315/291; 315/363
(58) Field of Classification Search
USPC ......... 315/291, 294, 297, 307, 312, 362, 192; 345/82
See application file for complete search history.

(56) References Cited

U.S. PATENT DOCUMENTS

| 6,194,960 B1 | 2/2001 | Nagumo |
| 2002/0163017 A1 * | 11/2002 | Nagumo ...................... 257/207 |
| 2003/0122502 A1 | 7/2003 | Clauberg et al. |
| 2007/0210722 A1 * | 9/2007 | Konno et al. .............. 315/185 S |

FOREIGN PATENT DOCUMENTS

| WO | 2007125466 A1 | 11/2007 |
| WO | WO 2007/125466 A1 * | 11/2007 |

* cited by examiner

*Primary Examiner* — Douglas W Owens
*Assistant Examiner* — Jonathan Cooper
(74) *Attorney, Agent, or Firm* — Yuliya Mathis

(57) ABSTRACT

Driver arrangements (1) comprise division circuits (100) with division inputs (101-102) for receiving input signals and division outputs (111-118) for supplying output signals to light sources (301-308). The division circuits (100) convert respective first and second input signals of a plurality of input signals into respective first and second parts of a further plurality of output signals. The driver arrangements (1) further comprise driver circuits (200) for driving the light sources (301-308) via the division circuits (100). The driver circuits (200) have driver outputs (201-202) for supplying the input signals to the division inputs (101-102). Such driver arrangements (1) no longer require a switch per light source (301-308). The plurality is preferably equal to or larger than two and smaller than the further plurality, and at least some of the first and the second parts are mutually different in size, amplitude or absolute value. The driver circuits (200) comprise controllable couplers (221-222) or controllable sources (211-212).

12 Claims, 6 Drawing Sheets

US 8,866,415 B2

DRIVER ARRANGEMENT WITH DIVISION CIRCUIT

FIELD OF THE INVENTION

The invention relates to a driver arrangement, a device comprising a driver arrangement, and a driving method.

Examples of such driver arrangements are arrangements for driving light sources such as non-organic light-emitting diodes, organic light-emitting diodes and laser light-emitting diodes.

BACKGROUND OF THE INVENTION

U.S. Pat. No. 6,194,960 discloses a driver integrated circuit comprising a division circuit with two inputs each coupled to the same power supply and with many outputs each coupled to a light-emitting diode via a switch of a driver circuit.

OBJECT AND SUMMARY OF THE INVENTION

It is an object of the invention to provide a driver arrangement that does not require a switch per light source.

Further objects of the invention are to provide a device and a driving method that do not require a switch per light source.

According to a first aspect of the invention, a driver arrangement comprises
 a division circuit for converting a first input signal of a plurality of input signals into first parts of a further plurality of output signals and for converting a second input signal of the plurality of input signals into second parts of the further plurality of output signals, the division circuit comprising division inputs for receiving the input signals and division outputs for supplying the output signals to light sources, and
 a driver circuit for driving the light sources via the division circuit, the driver circuit comprising driver outputs for supplying the input signals to the division inputs.

By placing the division circuit between the driver circuit and the light sources, one light source can be controlled via several division inputs, and, at the same time, several light sources can be controlled via one division input. As a result, the driver arrangement no longer requires a switch per light source.

In one embodiment of the driver arrangement according to the invention, the plurality is equal to or larger than two and smaller than the further plurality, and at least some of the first parts are mutually different in size, amplitude or absolute value and at least some of the second parts are mutually different in size, amplitude or absolute-value. In this case, the division circuit divides an amount of the power available at one division input into different sub-amounts of power to be supplied via the different division outputs. At one division output, a sum of several sub-amounts of power originating from several division inputs is available.

In a further embodiment of the driver arrangement according to the invention, the driver circuit comprises a controllable coupler per driver output for controllably coupling a power supply to said driver output, which controllable coupler is coupled to said driver output. The controllable coupler may be a switch for connecting, in a conducting mode, the power supply and the driver output and for disconnecting, in a non-conducting mode, the power supply and the driver output. Alternatively, the controllable coupler may be a selector for coupling, in a first mode, the power supply and the driver output via a first element and for coupling, in a second mode, the power supply and the driver output via a second element, etc.

In a further embodiment of the driver arrangement according to the invention, the driver circuit comprises a controllable source per driver output, which controllable source is coupled to said driver output. The controllable source may be a source for supplying, in a first mode, the input signal to the driver output and for not supplying, in a second mode, the input signal to the driver output. Alternatively, the controllable source may be a source for supplying, in a first mode, an input signal of a first type to the driver output and for supplying, in a second mode, an input signal of a second type to the driver output, etc.

In a further embodiment of the driver arrangement according to the invention, the division circuit comprises
 a first element having a first terminal coupled to a first division input and a second terminal coupled to a first division output,
 a second element having a first terminal coupled to the first division output and a second terminal coupled to a second division output,
 a third element having a first terminal coupled to a second division input and a second terminal coupled to a third division output,
 a fourth element having a first terminal coupled to the third division output and a second terminal coupled to a fourth division output, and
 a fifth element having a first terminal coupled to the second division output and a second terminal coupled to the fourth division output.

In an embodiment of the driver arrangement according to the invention, the elements are resistors.

In an embodiment of the driver arrangement according to the invention, the elements are inductors.

In an embodiment of the driver arrangement according to the invention, the input signals are pulse signals. Such pulse signals may have a period and a duty cycle. Further control of the light sources may be introduced by adjusting the period and/or the duty cycle. A control unit may control the controllable couplers and/or the controllable sources and/or may set the right level of the sources and/or the right control signals for the couplers and/or the sources, etc.

In an embodiment of the driver arrangement according to the invention, a period and/or a duty cycle of the pulse signals define one or more brightness parameters of the light sources. The combination of the elements in the form of inductors and the input signals in the form of pulse signals creates very advantageous results. By appropriately selecting the timing for the pulses of the pulse signals, an effective current-limiting feature of the elements can be introduced and/or controlled.

In an embodiment of the driver arrangement according to the invention, the input signals and the output signals are current signals.

According to a second aspect of the invention, a device comprises the driver arrangement according to the invention and further comprises a light source per division output, which light source is coupled to said division output.

In an embodiment of the device according to the invention, each light source comprises one or more light-emitting diodes. Two or more light-emitting diodes of a light source may be connected serially and/or in parallel.

According to a third aspect of the invention, a driving method comprises the steps of
 converting a first input signal of a plurality of input signals into first parts of a further plurality of output signals and converting a second input signal of the plurality of input signals into second parts of the further plurality of output signals by means of a division circuit, the division circuit having division inputs for receiving the input signals and division outputs for supplying the output signals to light sources, and driving the light sources by means of a driver circuit via the division circuit, the driver circuit having driver outputs for supplying the input signals to the division inputs.

Embodiments of the method correspond to the embodiments of the driver arrangement and the device.

The invention is based on the recognition that, in a driver arrangement, a switch per light source is to be avoided for reasons of cost and complexity.

Basically, a division circuit may have to be located between a driver circuit and light sources.

The problem of providing a driver arrangement that does not require a switch per light source is thereby solved. It has the additional advantage that the driver arrangement is simpler and that malfunctioning of a part of the driver circuit does not result in a light source being no longer reachable.

These and other aspects of the invention are apparent from and will be elucidated with reference to the embodiments described hereinafter.

DESCRIPTION OF EMBODIMENTS

Figure 1:
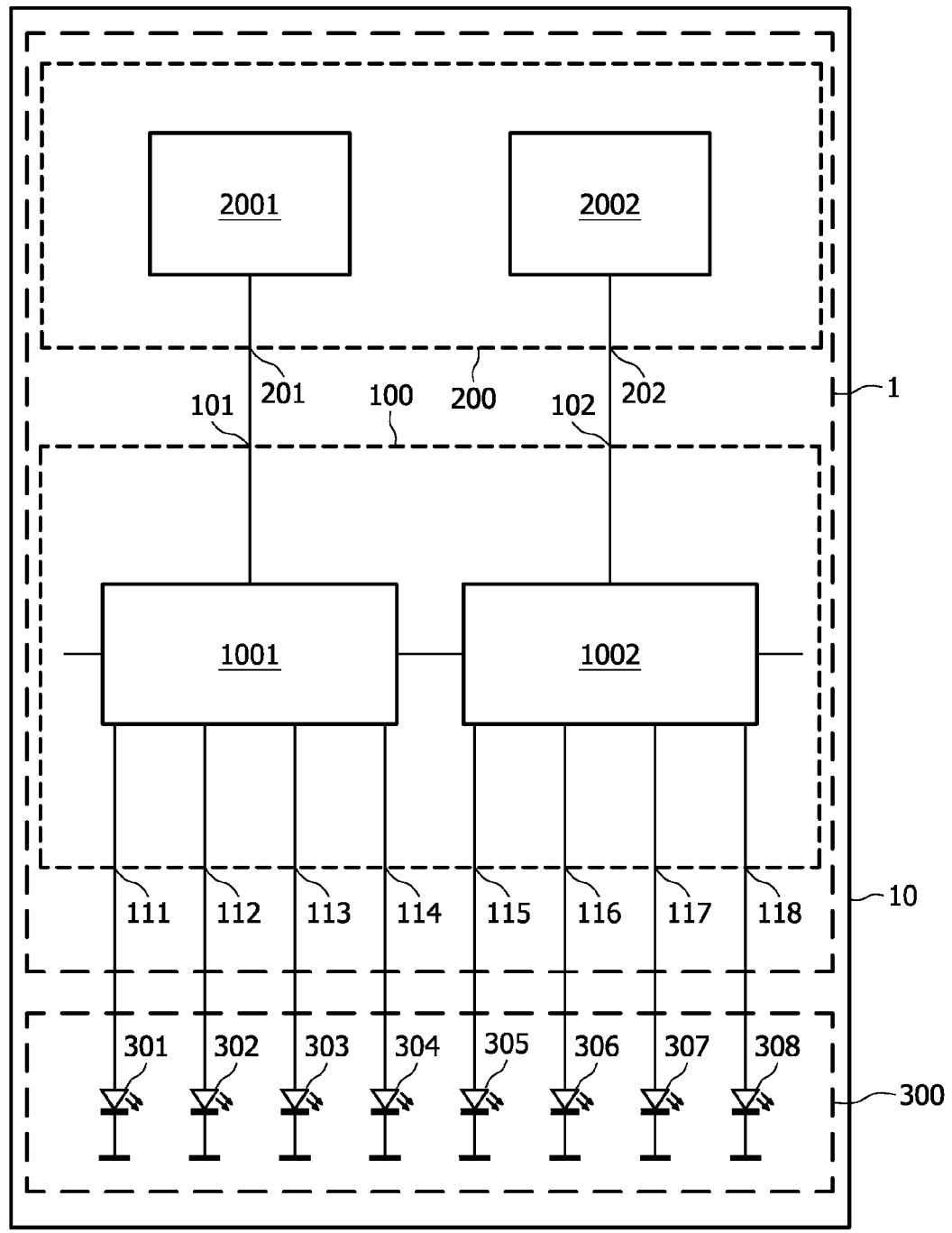
FIG. 1 shows a first embodiment of a driver arrangement and a device.

FIG. 1 shows a first embodiment of a driver arrangement 1 and a device 10. The device 10 comprises the driver arrangement 1 and a light system 300 comprising light sources 301-308 each of which comprises, for example, one or more non-organic light-emitting diodes or organic light-emitting diodes or laser light-emitting diodes. The driver arrangement 1 comprises a division circuit 100 for converting a first input signal of a plurality of input signals into first parts of a further plurality of output signals and for converting a second input signal of the plurality of input signals into second parts of the further plurality of output signals. The division circuit 100 has division inputs 101-102 for receiving the input signals and division outputs 111-118 for supplying the output signals to the light sources 301-308. The driver arrangement 1 further comprises a driver circuit 200 for driving the light sources 301-308 via the division circuit 100. The driver circuit 200 has driver outputs 201-202 for supplying the input signals to the division inputs 101-102.

The division circuit 100 comprises, for example, a first passive (distribution and/or interpolation) network 1001 coupled to the division input 101 and to the division outputs 111-114 and, for example, a second passive (distribution and/or interpolation) network 1002 coupled to the division input 102, to the division outputs 115-118 and to the first passive network 1001.

The driver circuit 200 comprises, for example, a first driver 2001 coupled to the driver output 201 and, for example, a second driver 2002 coupled to the driver output 202.

The plurality of input signals or the plurality of division inputs 101-102 is preferably equal to or larger than two and smaller than the further plurality of output signals or division outputs 111-118. At least some of the first parts of the output signals, all of which first parts originate from the first input signal, are mutually different in size, amplitude or absolute value, and at least some of the second parts of the output signals, all of which second parts originate from the second input signal, are mutually different in size, amplitude or absolute value. The division circuit 100 divides an amount of power available at one division input 101-102 into different sub-amounts of power to be supplied via the different division outputs 111-118. A sum of several sub-amounts of power originating from several division inputs 101-102 is available at one division output 111-118.

The power division depends on the selected type and value of the elements, the properties of the input signals and the characteristics of the light sources. In a first possibility, the characteristics of the light sources connected to the division outputs are matched. As a result, the driver arrangement can supply mutually different power levels to the light sources. In a second possibility, the characteristics of the light sources are selected in such a way that the differences between the individual division outputs are compensated to some extent. In this case, there is at least one combination of light source characteristics, switching states of the switches and input power that will result in a substantially homogeneous light emission from all light sources. When light-emitting diodes are used, an appropriate selection of the forward voltage and/or intensity bin might be required to achieve this.

In one example, four pairs each of a driver coupled to a passive network may be used, with each passive network being coupled to four light sources. However, other numbers of drivers, passive networks and light sources are not to be excluded.

Figure 2:
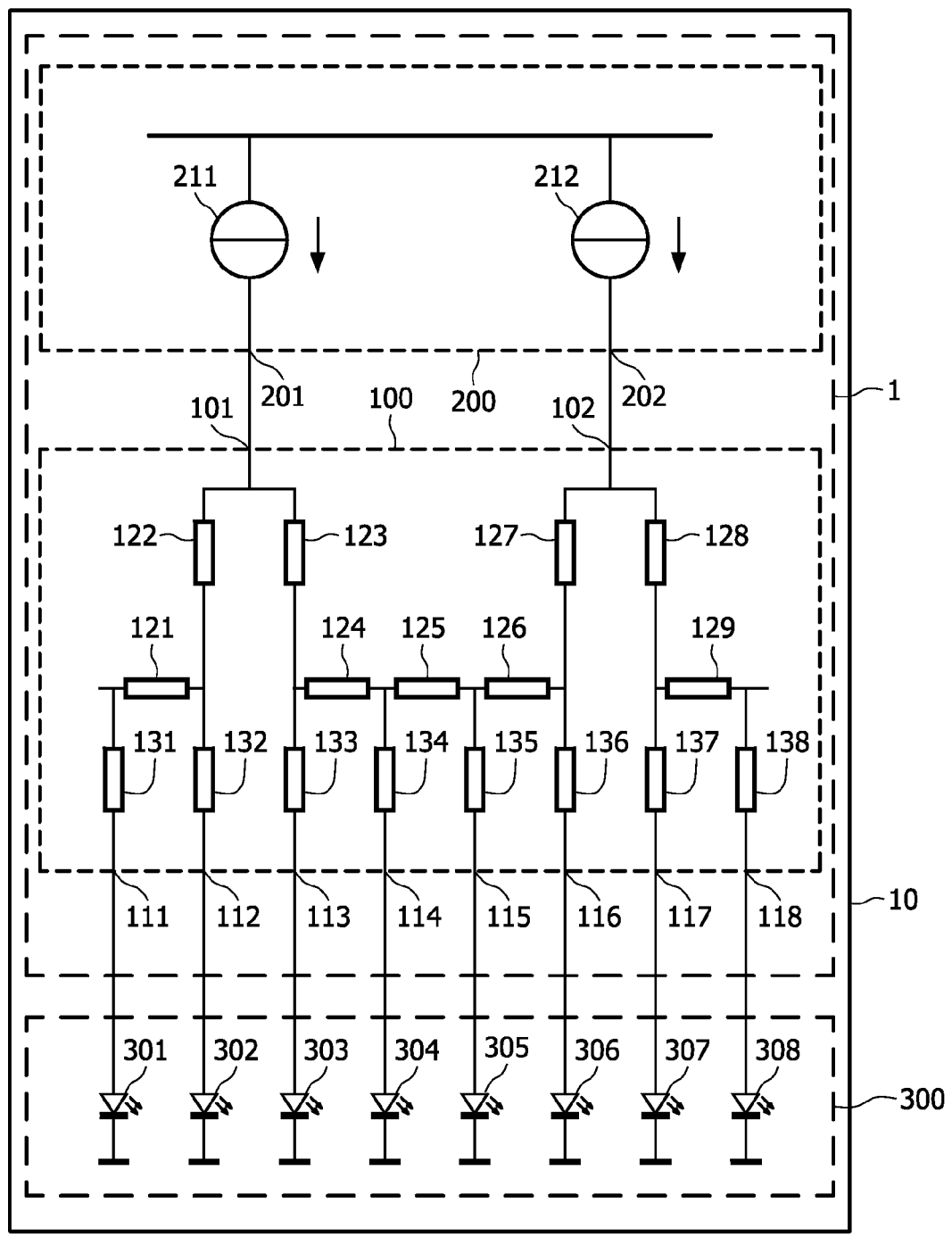
FIG. 2 shows a second embodiment of a driver arrangement and a device.

FIG. 2 shows a second embodiment of a driver arrangement 1 and a device 10. The device 10 comprises the driver arrangement 1 and a light system 300 comprising light sources 301-308 each of which comprises, for example, one or more non-organic light-emitting diodes or organic light-emitting diodes or laser light-emitting diodes. The driver arrangement 1 comprises a division circuit 100 for converting a first input signal of a plurality of input signals into first parts of a further plurality of output signals and for converting a second input signal of the plurality of input signals into second parts of the further plurality of output signals. The division circuit 100 has division inputs 101-102 for receiving the input signals and division outputs 111-118 for supplying the output signals to the light sources 301-308. The driver arrangement 1 further comprises a driver circuit 200 for driving the light sources 301-308 via the division circuit 100. The driver circuit 200 has driver outputs 201-202 for supplying the input signals to the division inputs 101-102.

The division circuit 100 comprises, for example, elements 121-129 (main elements) and, in addition, elements 131-138 (distribution elements). These elements 131-138 may alternatively be left out or they may form integral parts of the light sources 301-308. The division input 101 is coupled to the division output 111 via a series connection of the elements 122, 121 and 131, to the division output 112 via a series connection of the elements 122 and 132, to the division output 113 via a series connection of the elements 123 and 133, to the division output 114 via a series connection of the elements 123, 124 and 134, to the division output 115 via a series connection of the elements 123, 124, 125 and 135, to the division output 116 via a series connection of the elements 123, 124, 125, 126 and 136, to the division output 117 via a series connection of the elements 123, 124, 125, 126, 127, 128 and 137, and to the division output 118 via a series connection of the elements 123, 124, 125, 126, 127, 128, 129 and 138.

The division input 102 is coupled to the division output 118 via a series connection of the elements 128, 129 and 138, to the division output 117 via a series connection of the elements 128 and 137, to the division output 116 via a series connection of the elements 127 and 136, to the division output 115 via a series connection of the elements 127, 126 and 135, to the division output 114 via a series connection of the elements 127, 126, 125 and 134, to the division output 113 via a series connection of the elements 127, 126, 125, 124 and 133, to the division output 112 via a series connection of the elements 127, 126, 125, 124, 123, 122 and 132, and to the division output 111 via a series connection of the elements 127, 126, 125, 124, 123, 122, 121 and 131.

The driver circuit 200 comprises a controllable source 211-212 per driver output 201-202, which controllable source 211-212 is coupled to said driver output 201-202. The controllable source 211-212 may be a source, preferably a current source, for example, when using light sources 301-308 in the form of light-emitting diodes, or it may alternatively be a voltage source, for supplying, in a first mode, the input signal such as a current signal or a voltage signal to the driver output 201-202 and for not supplying, in a second mode, the input signal to the driver output 201-202. Alternatively, the controllable source 211-212 may be a source for supplying, in a first mode, an input signal of a first type to the driver output 201-202, for supplying, in a second mode, an input signal of a second type to the driver output, and for supplying, in a third mode, an input signal of a third type to the driver output, etc. The respective controllable sources 211-212 and light sources 301-308 are further coupled to, for example, respective first (plus) and second (ground) reference potentials as shown.

The plurality of input signals or the plurality of division inputs 101-102 is preferably equal to or larger than two and smaller than the further plurality of output signals or division outputs 111-118. At least some of the first parts of the output signals, all of which first parts originate from the first input signal, are mutually different in size, amplitude or absolute value, and at least some of the second parts of the output signals, all of which second parts originate from the second input signal, are mutually different in size, amplitude or absolute value. The division circuit 100 divides an amount of power available at one division input 101-102 into different sub-amounts of power to be supplied via the different division outputs 111-118. A sum of several sub-amounts of power originating from several division inputs 101-102 is available at one division output 111-118.

The elements 122, 123, 127 and 128 may have a value which is equal to, for example, half the value of the elements 121, 124, 125, 126 and 129. A current source may be replaced by a voltage source with a relatively high serial resistor. The elements 131-138 improve a current distribution.

Depending on the elements used, the average value of the sum of the sub-amounts of power at the division outputs is equal to or smaller than the average value of the total power received from the division inputs.

Figure 3:
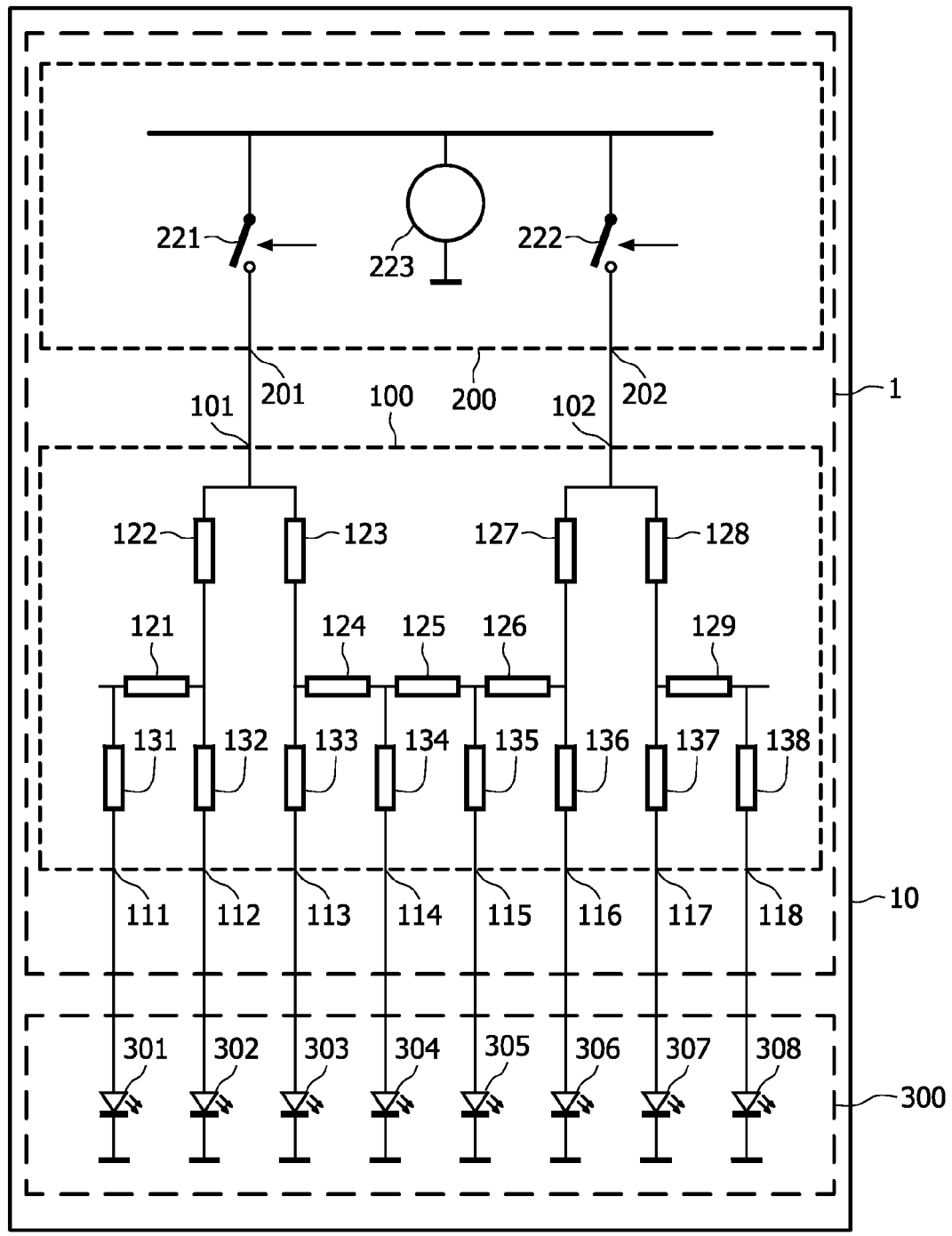
FIG. 3 shows a third embodiment of a driver arrangement and a device.

FIG. 3 shows a third embodiment of a driver arrangement 1 and a device 10. This third embodiment differs from the second embodiment shown in FIG. 2 only in that the driver circuit 200 comprises a controllable coupler 221-222 per driver output 201-202 for controllably coupling a power supply 223 to said driver output 201-202, which controllable coupler 221-222 is coupled to said driver output 201-202. The controllable coupler 221-222 may be a switch for connecting, in a conducting mode, the power supply 223 and the driver output 201-202 and for disconnecting, in a non-conducting mode, the power supply 223 and the driver output 201-202. Alternatively, the controllable coupler 221-222 may be a selector for coupling, in a first mode, the power supply 223 and the driver output 201-202 via a first element, for coupling, in a second mode, the power supply and the driver output via a second element, and for coupling, in a third mode, the power supply and the driver output via a third element, etc.

Either one or several power supplies may be used to supply the power to all switches.

In FIGS. 2 and 3, the elements 121-129 and 131-138 may be resistors such as resistive components or integrated resistors or resistive layers.

Figure 4:
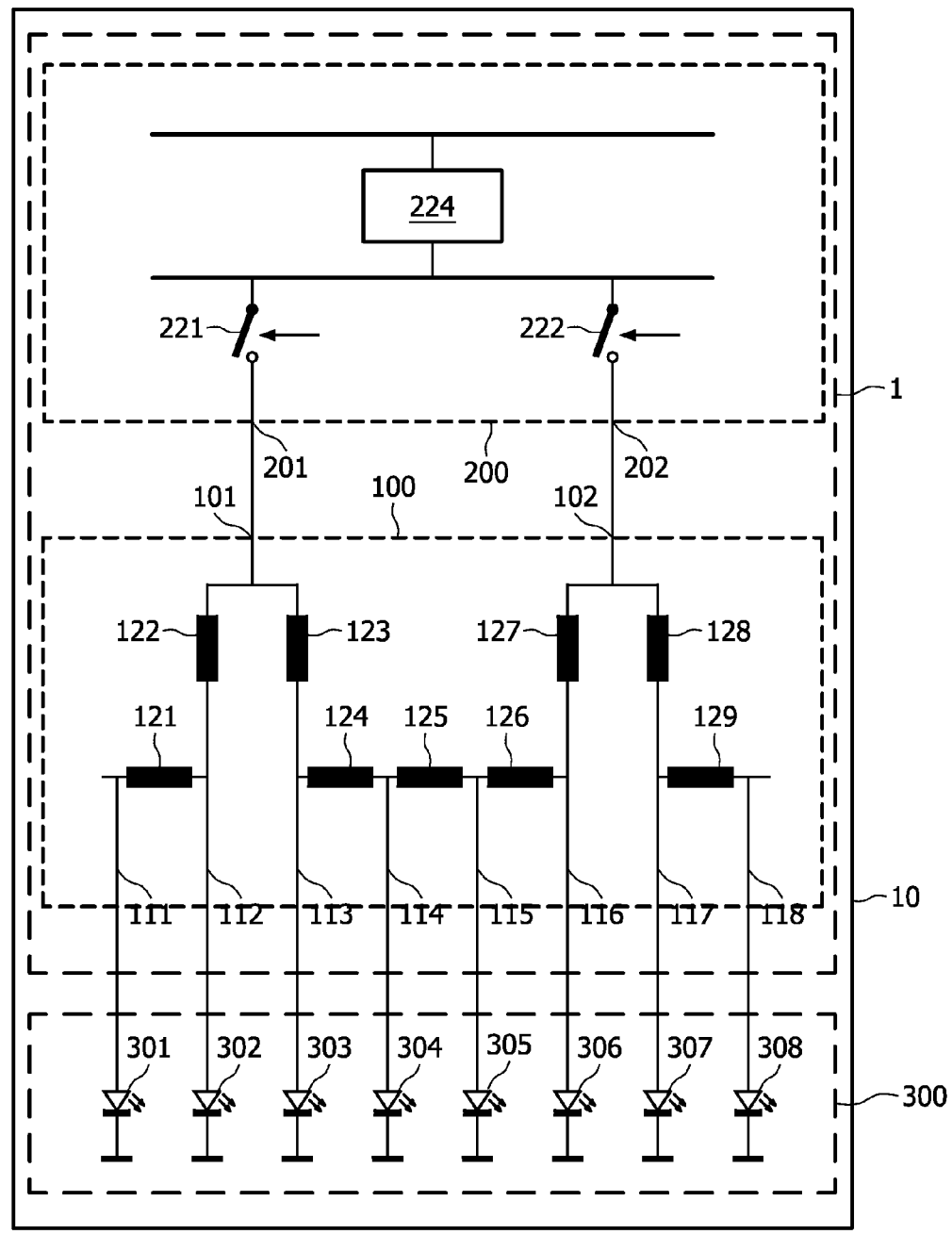
FIG. 4 shows a fourth embodiment of a driver arrangement and a device.

FIG. 4 shows a fourth embodiment of a driver arrangement 1 and a device 10. This fourth embodiment differs from the second and third embodiments shown in FIGS. 2 and 3 only in that the elements 131-138 have been left out and that the elements 121-129 are inductors, in which case the input signals may be pulse signals originating from a source 224 via the controllable couplers 221-222. Such pulse signals may have a period and a duty cycle. By adjusting the period and/or the duty cycle, further control of the light sources 301-308 may be introduced, as is apparent from FIGS. 7 and 8.

The fourth embodiment shown in FIG. 4 has the interesting and important aspect that the width of the distribution can be set by means of a selection of an appropriate period of time. This is a special advantage of the inductive interpolation network. The longer the period, the wider the current distribution will be. Assuming a constant input power, this would result in more LEDs shining at a lower intensity. In contrast to this, only a small number of LEDs will shine at a high intensity for very short periods of time. Even more variants can be produced by means of other switch settings. The input voltage (or input current) level and the duty cycle can be used to influence the total brightness. As a result, the brightness, the position of the peak brightness and the width of the brightness distribution can be controlled electronically. The inductive interpolation network has the further advantage that no dissipating resistors are used for interpolation, which reduces electrical losses.

In practice, the inductors will have an inductive property as well as a resistive property. When supplying DC signals, the resistive property of the inductors will determine the division properties. When supplying pulse signals, also the inductive property of the inductors will influence the division properties.

Figure 5:
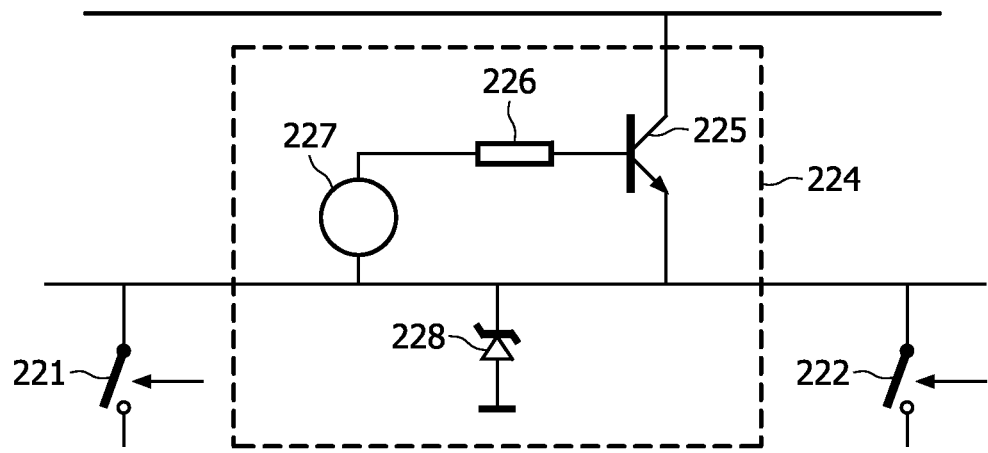
FIG. 5 shows an embodiment of a source.

FIG. 5 shows an embodiment of a source 224, without the exclusion of further embodiments. The source 224 comprises a pulse voltage source 227, a first side of which is coupled to a control electrode of a bipolar transistor 225 via a resistor 226, with a first main electrode of the bipolar transistor being coupled to the couplers 221-222 and to a second side of the pulse voltage source 227 and to ground via a zener diode 228, and a second main electrode being coupled to another voltage source which is further coupled to ground. This embodiment of the source 224 was used when creating FIGS. 7 and 8.

Figure 6:
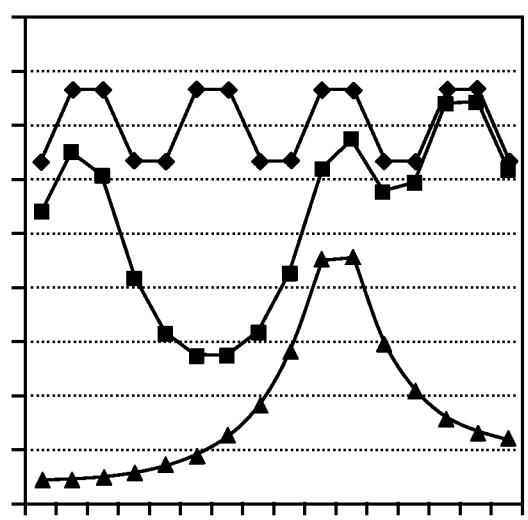
FIG. 6 shows a first simulation result.

FIG. 6 shows a first simulation result for a device comprising sixteen light-emitting diodes, a driver circuit with four driver outputs, and a division circuit with four division inputs and sixteen division outputs. The division circuit comprises nineteen main elements in the form of resistors. Distribution elements are not used here. Horizontally, each of the sixteen light-emitting diodes is shown. Vertically, an absolute value or an amplitude of a current flowing through this light-emitting diode is shown. The upper curve represents a case in which all of the four sources or couplers in the driver circuit are activated (=generating an input signal destined for the division circuit). The middle curve represents a case in which only the first, third and fourth sources or couplers in the driver circuit are activated (=generating an input signal destined for the division circuit). The lower curve represents a case in which only the third source or coupler in the driver circuit is activated (=generating an input signal destined for the division circuit).

Figure 7:
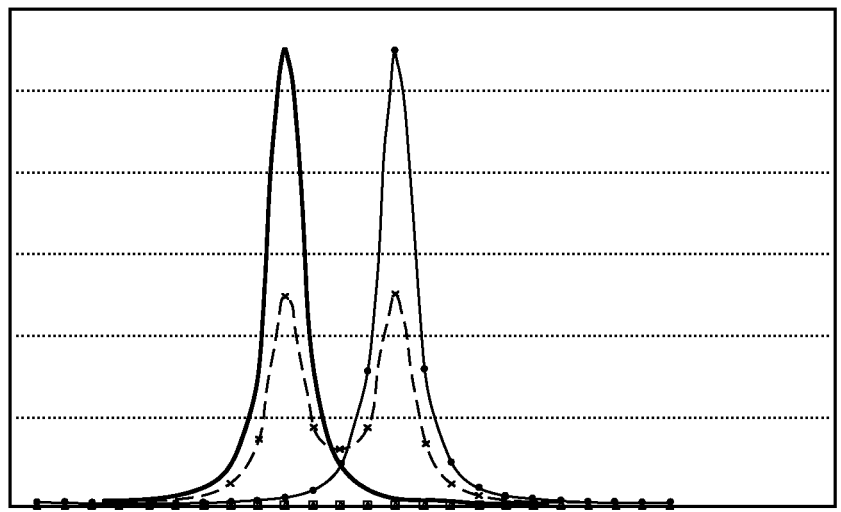
FIG. 7 shows a second simulation result.

FIG. 7 shows a second simulation result for a device comprising twenty-four light-emitting diodes, a driver circuit with six driver outputs, and a division circuit with six division inputs and twenty-four division outputs, wherein the input signals are pulse signals having a certain pulse length and a certain pulse period. The division circuit comprises twenty-nine main elements in the form of inductors. Distribution elements are not used here. Horizontally, each of the twenty-four light-emitting diodes is shown. Vertically, an absolute value or an amplitude of a current flowing through this light-emitting diode is shown. The left high peak curve represents a case in which only a third source or coupler in the driver circuit is activated (=generating an input signal destined for the division circuit). The lower double peak curve represents a case in which only the third and fourth sources or couplers in the driver circuit are activated (=generating an input signal destined for the division circuit). The right high peak curve represents a case in which only the fourth source or coupler in the driver circuit is activated (=generating an input signal destined for the division circuit).

Figure 8:
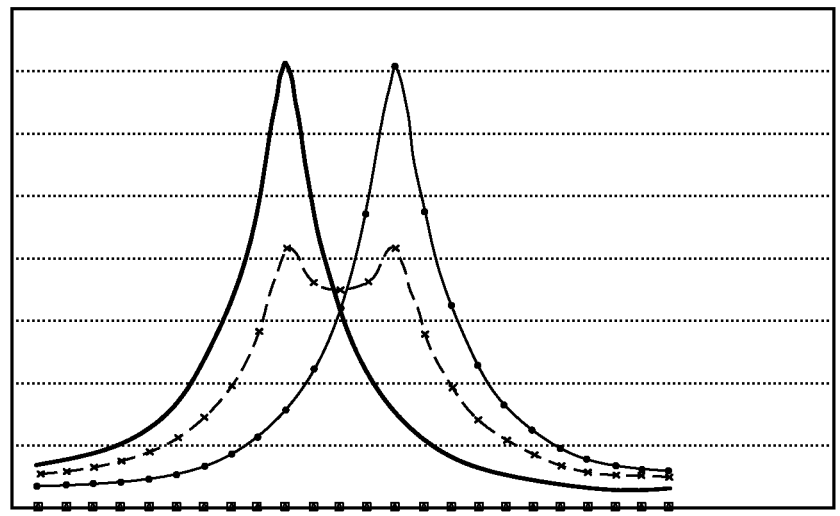
FIG. 8 shows a third simulation result.

FIG. 8 shows a third simulation result for the device shown in FIG. 7, wherein a period and a pulse length of an input signal in the form of a pulse signal has been made ten times longer. Although the relative activation time has been kept the same as for the results shown in FIG. 7, a different distribution is created in FIG. 8, due to the fact that the effective current-limiting features of the inductors are now more determined by their resistive rather than by their inductive properties. The result therefore shows a wider and smoother distribution, more similar to the results shown in FIG. 6, which is based on the use of resistive elements.

This invention may be applied to an integrated light-emitting diode carrier with driving electronics that allow a light-emitting diode line to be made with a plurality of current drivers and a larger plurality of light-emitting diodes, such that every current driver generates a light effect with a plurality of light-emitting diodes. These are connected in such a way that there are no fixed segments of light-emitting diodes that are driven by one driver but, instead, there are overlapping segments and, for example, a Gaussian distribution of the driving current over the line.

As a low-cost and simple example, a resistive interpolation network may be used as division circuit. A more elaborate version uses reactive components, e.g. inductors. With such a configuration, the width of the current distribution can easily be changed by selecting an appropriate pulse frequency. As a result, the brightness, the number of brightness peaks, the position of the peak brightness and the width of the brightness distribution can be controlled electronically. Graceful degradation of the lighting effect for defective driver channels can easily be achieved.

The division circuit in the form of a passive network connects the individual n light-emitting diodes to the m driver channels with $n=k*m$ and $k=2, 3, 4 \ldots$. The current in the light-emitting diodes "between" two driver channels is interpolated between the two inserted driver currents, taking the "distance" of the individual light-emitting diodes from the driving input into account. Hence, only m color values need to be calculated and still all n light-emitting diodes receive relatively individual currents leading to very soft light effect changes, both in color and brightness. In addition, the power supplied from a driver can be guided to different taps of the interpolation network by means of some switches. Then, $n=m*k*s$ light-emitting diodes can be addressed, wherein s is the number of switches per driver.

The light emitted by the light sources is determined by several factors. First, it depends on the characteristics of the light sources. Secondly, it depends on the power supplied to the light sources. By using differently colored light sources at different positions in the device, the resulting emitted light color can be determined by the power supplied to the division outputs.

The invention overcomes the defective driver issue because neighbor drivers will carry some of the current while neighboring light-emitting diodes get a lower intensity. In this way, light-emitting diodes do not turn off totally, but defects cause some graceful degradation. Simple ways of repair may also be a result of this invention, because single drivers can be built as separate modules, e.g. with click-on contacts. In this way, these can easily be detached and exchanged. An additional advantage for multiple lamps mounted in sequence is that, due to current distribution, no abrupt changes in intensities (and colors) occur between neighboring lamps if an additional drive current daisy chain is used.

FIGS. 2, 3 and 4 show a connection (element 125) which can be used to connect neighboring lamps in order to achieve soft transitions in flux (and possibly color) between adjacent light sources. FIG. 6 shows a result of a calculation of currents. The currents in the light-emitting diodes vary slightly (depending on component selection). It is clearly visible that there is a soft decay of light-emitting diode currents in dependence upon a distance from an insertion point.

The division circuit does not necessarily need to be constructed from separate components but can be advantageously manufactured from a resistive layer which is coated or laminated, e.g. on a PCB or from a sheet of metal which is cut in order to acquire the proper resistances. The simplest version of a technical implementation is a resistive wire (e.g. from constantan) to which the light-emitting diode components are attached. Elements in the form of inductors or capacitors may also be printed on PCB, etc.

As a further variant, the light-emitting diodes together with the division circuit may be mounted in a transparent, possibly flexible cover. Drivers can then be connected by means of cutting contacts. In this way, light-emitting diode strings can easily be bent to an artificial shape. The drivers are constructed as a clip on mounting means for driving and holding the light-emitting diode string. This provides the advantage that the final number of light-emitting diodes per driver can be selected at a late point in time. It has the additional advantage that a defective driver can easily be detached from the light-emitting diode string and exchanged by a functional clamp.

Potential applications are, for example, lamps with many channels to achieve a high spatial resolution. Examples of such lamps in one spatial direction are light-emitting diode wall-washers or tubes. Examples of 2D spatial resolution are liquid crystal display backlight applications. The channels may be laterally distributed or arranged in a matrix.

In summary, driver arrangements 1 comprise division circuits 100 with division inputs 101-102 for receiving input signals and division outputs 111-118 for supplying output signals to light sources 301-308. The division circuits 100 convert respective first and second input signals of a plurality of input signals into respective first and second parts of a further plurality of output signals. The driver arrangements 1 further comprise driver circuits 200 for driving the light sources 301-308 via the division circuits 100. The driver circuits 200 have driver outputs 201-202 for supplying the input signals to the division inputs 101-102. Such driver arrangements 1 no longer require a switch per light source 301-308. The plurality is preferably equal to or larger than two and smaller than the further plurality, and at least some of the first or the second parts are mutually different in size, amplitude or absolute value. The driver circuits 200 comprise controllable couplers 221-222 or controllable sources 211-212.

The invention, which has been illustrated and described in detail in the drawings and the foregoing description by way of non-limiting example, is not limited to the disclosed embodiments. For example, it is possible to carry the invention into effect in an embodiment in which different parts of the different disclosed embodiments are combined to a new embodiment.

Other variants of the disclosed embodiments can be understood and effected by those skilled in the art in practicing the claimed invention, from a study of the drawings, the disclosure, and the appended claims. In the claims, use of the verb "comprise" and its conjugations does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE SIGNS 1 driver arrangement
10 device
100 division circuit
101-102 division inputs
111-118 division outputs
121-129 elements
131-138 elements
200 driver circuit
210-202 driver outputs
211-212 controllable sources
221-222 controllable couplers
223 power supply
224 source
225 bipolar transistor
226 resistor
227 pulse voltage source
228 zener diode
300 light system
301-308 light sources
1001-1002 passive networks
2001-2002 drivers

The invention claimed is:

1. A driver arrangement comprising:
   a division circuit for converting a first input signal of a plurality of input signals into first parts of a further plurality of output signals and for converting a second input signal of the plurality of input signals into second parts of the further plurality of output signals, the division circuit comprising division inputs for receiving the input signals and division outputs for supplying the output signals to light sources; and
   a driver circuit for driving the light sources via the division circuit, the driver circuit comprising driver outputs for supplying the input signals to the division inputs;
   wherein the division circuit comprises a first element having a first terminal coupled to a first division input and a second terminal coupled to a first division output, a second element having a first terminal coupled to the first division output and a second terminal coupled to a second division output, a third element having a first terminal coupled to a second division input and a second terminal coupled to a third division output, a fourth element having a first terminal coupled to the third division output and a second terminal coupled to a fourth division output, and a fifth element having a first terminal coupled to the second division output and a second terminal coupled to the fourth division output.

2. The driver arrangement as claimed in claim 1, wherein the plurality is equal to or larger than two and smaller than the further plurality, and at least some of the first parts are mutually different in size, amplitude or absolute value and at least some, of the second parts are mutually different in size, amplitude or absolute-value.

3. The driver arrangement as claimed in claim 1, wherein the driver circuit comprises a controllable coupler per driver output for controllably coupling a power supply, to said driver output, which controllable coupler is coupled to said driver output.

4. The driver arrangement as claimed in claim 1, wherein the driver circuit comprises a controllable source per driver output, which controllable source is coupled to said driver output.

5. The driver arrangement as claimed in claim 1, wherein the elements are resistors.

6. The driver arrangement as claimed in claim 1, wherein the elements are inductors.

7. The driver arrangement as claimed in claim 1, wherein the input signals are pulse signals.

8. The driver arrangement as claimed in claim 7, wherein a period and/or a duty cycle of the pulse signals define one or more brightness parameters of the light sources.

9. The driver arrangement as claimed in claim 1, wherein the input signals and the output signals are current signals.

10. A device comprising the driver arrangement as claimed in claim 1 and further comprising a light source per division output which light source is coupled to said division output.

11. The device as claimed in claim 10, wherein each light source comprises one or more light-emitting diodes.

12. A driving method comprising the steps of:
   converting a first input signal of a plurality of input signals into first parts of a further plurality of output signals and converting a second input signal of the plurality of input signals into second parts of the further plurality of output signals by means of a division circuit, the division circuit having division inputs for receiving the input signals and division outputs supplying the output signals to light sources; and driving the light sources means of a driver circuit via the division circuit the driver circuit having driver outputs for supplying the input signals to the division inputs;

wherein the division circuit comprises a first element having a first terminal coupled to a first division input and a second terminal coupled to a first division output, a second element having a first terminal coupled to the first division output and a second terminal coupled to a second division output, a third element having a first terminal coupled to a second division input and a second terminal coupled to a third division output, a fourth element having a first terminal coupled to the third division output and a second terminal coupled to a fourth division output, and a fifth element having a first terminal coupled to the second division output and a second terminal coupled to the fourth division output.

* * * * *